United States Patent
Kikuchi (10) Patent No.: US 10,170,807 B2
(45) Date of Patent: Jan. 1, 2019

(54) SECONDARY BATTERY COOLING SYSTEM

(71) Applicant: TOYOTA JIDOSHA KABUSHIKI KAISHA, Toyota-shi, Aichi-ken (JP)

(72) Inventor: Takuro Kikuchi, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 21 days.

(21) Appl. No.: 15/017,697

(22) Filed: Feb. 8, 2016

(65) Prior Publication Data

US 2016/0276719 A1 Sep. 22, 2016

(30) Foreign Application Priority Data

Mar. 17, 2015 (JP) ................................. 2015-054016

(51) Int. Cl.
| | |
|---|---|
| *H01M 10/63* | (2014.01) |
| *H01M 10/34* | (2006.01) |
| *H01M 10/613* | (2014.01) |
| *H01M 10/625* | (2014.01) |
| *H01M 10/42* | (2006.01) |
| *H01M 10/48* | (2006.01) |
| *B60L 11/18* | (2006.01) |

(52) U.S. Cl.
CPC ......... *H01M 10/63* (2015.04); *B60L 11/1874* (2013.01); *H01M 10/425* (2013.01); *H01M 10/486* (2013.01); *H01M 10/613* (2015.04); *H01M 10/625* (2015.04); H01M 10/345 (2013.01); H01M 2220/20 (2013.01); Y02E 60/124 (2013.01)

(58) Field of Classification Search
CPC .. H01M 10/63; H01M 10/613; H01M 10/625; H01M 10/486; H01M 10/425; H01M 10/345; H01M 2220/20; B60L 11/1874; Y02E 60/124
See application file for complete search history.

(56) References Cited

U.S. PATENT DOCUMENTS

| | | | |
|---|---|---|---|
| 2007/0120537 A1* | 5/2007 | Yamamoto ......... | G01R 31/3679 320/150 |
| 2007/0152640 A1* | 7/2007 | Sasaki ................ | B60H 1/00278 320/150 |

(Continued)

FOREIGN PATENT DOCUMENTS

JP 2008-27888 A 2/2008

*Primary Examiner* — Lisa S Park
(74) *Attorney, Agent, or Firm* — Sughrue Mion, PLLC (57) ABSTRACT

A secondary battery cooling system includes a temperature sensor for detecting a temperature of a battery, an electrically operated cooling fan, and a control unit. The control unit determines whether or not cooling of the battery is necessary based on the battery temperature detected by the temperature sensor and a heat value of the battery estimated when an ignition switch is turned off, and, if the battery temperature is lower than a predetermined temperature and the estimated battery heat value exceeds a predetermined value in the determination, extends a length of time from the determination to a start of driving of the electrically operated cooling fan compared to when the heat value does not exceed the predetermined value, and cools the battery while the ignition switch of the vehicle is turned off. The battery can be thus cooled efficiently while charge and discharge is suspended.

4 Claims, 8 Drawing Sheets (56) References Cited

U.S. PATENT DOCUMENTS

2007/0298316 A1 12/2007 Yamamoto et al.
2010/0212339 A1* 8/2010 Kelty .................... B60L 3/0046
                                                                                     62/129

* cited by examiner

SECONDARY BATTERY COOLING SYSTEM

PRIORITY INFORMATION

This application claims priority to Japanese Patent Application No. 2015-054016 filed on Mar. 17, 2015, which is incorporated herein by reference in its entirety.

TECHNICAL FIELD

The present invention relates to a cooling system for an on-vehicle secondary battery.

BACKGROUND

A battery is known to generate Joule heat by its internal resistance and current passing therethrough when charged and discharged. In order to suppress excessive rise in the temperature of a battery, many methods are being used for cooling a battery with cooled air flowing from a cooling fan and the like. While with general methods for cooling a battery a fan is actuated to cool a battery when the temperature of the battery which is measured exceeds a predetermined temperature, methods have been also proposed for controlling an airflow of a cooling fan based not only on the temperature of the battery but also on the ambient temperature of the battery and the heat value of the battery, to thereby reduce a temperature rise caused by delayed cooling of the battery and an energy loss caused by excessive cooling (see JP 2008-27888 A, for example).

SUMMARY

A secondary battery is charged and discharged using a chemical reaction occurring between a positive electrode and a negative electrode of the battery via an electrolyte. In some cases, however, the chemical reaction occurs belatedly after the charge and discharge. In such cases, the chemical reaction after the stop of charge and discharge may cause a temperature rise some time after the stop of charge and discharge, or a temporary fall in the temperature of the battery after the charge and discharge stop followed by a further rise in the temperature.

To deal with a case where the temperature of a secondary battery rises belatedly after cease of charge and discharge of the secondary battery as described above, a method for continuously operating the cooling fan even after the stop of charge and discharge of the secondary battery may be considered. There has been a problem, however, that when the battery temperature is low at the end of charge and discharge, a difference between the battery temperature and the temperature of cooled air is small, which lowers the cooling efficiency.

It is therefore an advantage of the present invention to cool a secondary battery efficiently during suspension of charge and discharge of the secondary battery.

A secondary battery cooling system according to an aspect of the present invention includes a temperature sensor configured to detect a temperature of a secondary battery mounted on a vehicle, a cooling mechanism configured to cool the secondary battery, and a control unit configured to stop driving of the cooling mechanism. The control unit determines whether or not cooling of the secondary battery is necessary based on the temperature of the secondary battery detected by the temperature sensor and a heat value of the secondary battery which is estimated. If the temperature of the secondary battery is lower than a predetermined temperature and the heat value of the secondary battery which is estimated exceeds a predetermined value in the determination, the control unit extends a length of time from the determination to a start of driving of the cooling mechanism compared to when the heat value does not exceed the predetermined value, and cools the secondary battery while the ignition switch of the vehicle is turned off.

With the above structure, after the ignition switch is turned off and charge and discharge is stopped, the cooling mechanism is not driven if the temperature of the secondary battery is low, and thereafter if the temperature of the secondary battery rises, the cooling mechanism is driven to cool the secondary battery. It is therefore possible to start cooling the secondary battery at a desirable temperature after stop of charge and discharge, to thereby cool the secondary battery efficiently. Further, as, when the ignition switch is turned off, a heat value of the secondary battery is estimated to determine whether or not cooling of the secondary battery is necessary and the secondary battery is cooled while the ignition switch is off, it is possible to start cooling the secondary battery from a desirable temperature even when it is not possible to determine whether or not cooling is necessary, such as after the ignition switch is turned off.

Preferably, in the secondary battery cooling system according to the present invention, the secondary battery is a nickel metal hydride battery, and the heat value of the secondary battery is estimated based on an amount of oxygen absorbed by the negative electrode.

In a nickel metal hydride battery, after stop of charge and discharge, oxygen gas remaining in the battery is taken into the negative electrode by an oxygen absorbing reaction, and the temperature of the battery rises. Therefore, when the secondary battery is a nickel metal hydride battery, it is possible to determine whether or not cooling of the battery is necessary by estimating the heat value based on the amount of oxygen absorbed in the negative electrode.

Preferably, in the secondary battery cooling system according to the present invention, the amount of oxygen absorbed in the negative electrode is estimated based on the remaining capacity, the temperature, and the charging current of the secondary battery before the ignition switch is turned off.

If the secondary battery is a nickel metal hydride battery, it is possible to more suitably estimate the heat value after the ignition switch is turned off, by estimating the amount of oxygen absorbed in the negative electrode based on the remaining capacity, the temperature, and the charging current of the secondary battery immediately before the ignition switch is turned off.

Preferably, in the secondary battery cooling system according to the present invention, the control unit may be configured to stop detection of the temperature of the secondary battery after the ignition switch is turned off. This structure can prevent dark current from flowing for the purpose of temperature detection, thereby increasing the efficiency of a vehicle.

Advantages of the Invention

The present invention provides an advantage that it is possible to cool the secondary battery efficiently during suspension of charge and discharge of the secondary battery.

BRIEF DESCRIPTION OF THE DRAWINGS

A preferred embodiment of the present invention will be described in detail based on the following figures, wherein.

DESCRIPTION OF EMBODIMENTS

A preferred embodiment of the present invention will be described in detail with reference to the accompanying drawings. While in the following embodiment an example in which a nickel metal hydride battery, which is an example of a secondary battery, is mounted on an electric drive vehicle 100 will be described, the secondary battery mounted on the electric drive vehicle 100 is not limited to a nickel metal hydride battery.

Figure 1:
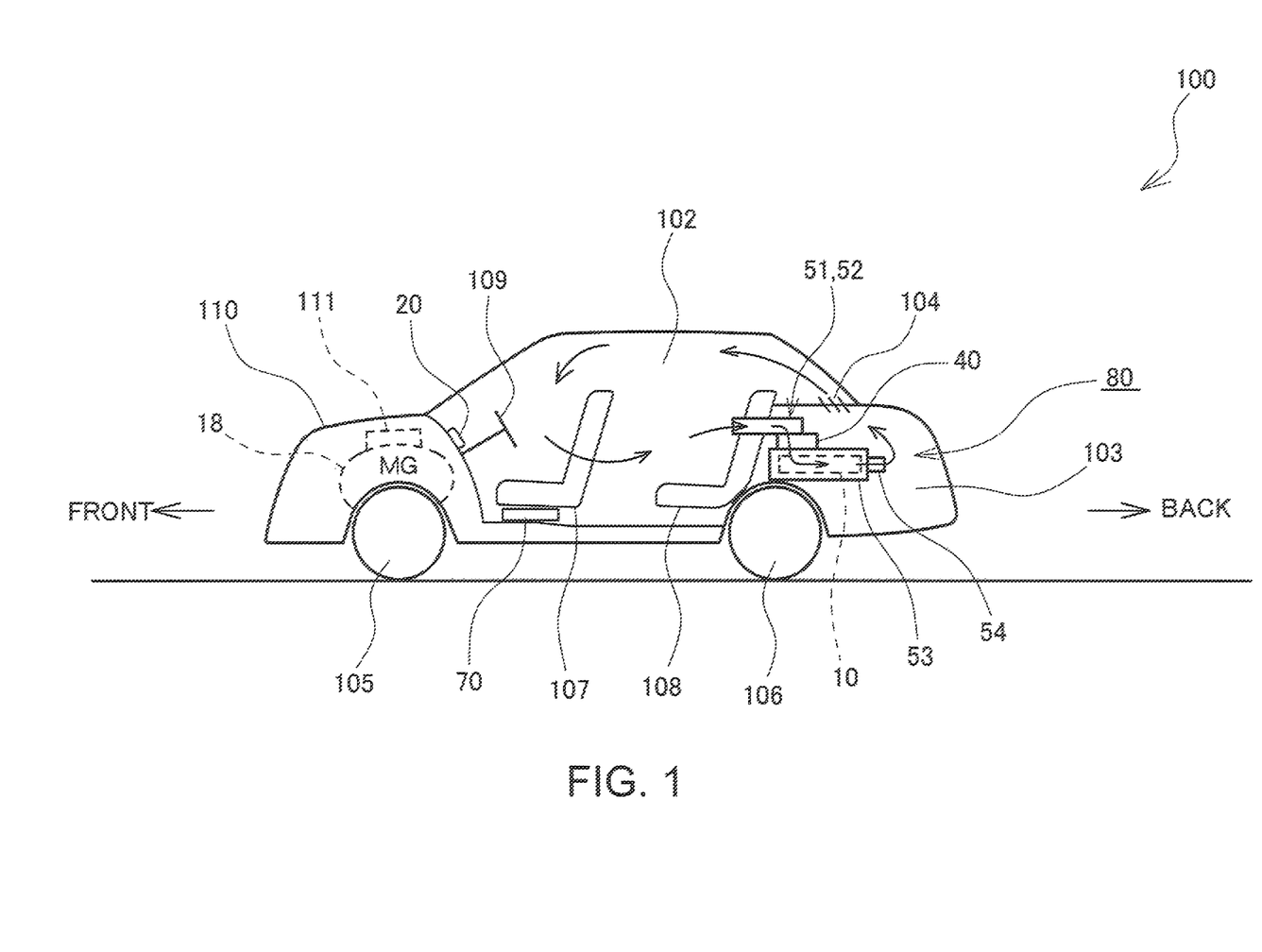
FIG. 1 is an explanatory view illustrating an electric drive vehicle on which a secondary battery cooling system according to an embodiment of the present invention is mounted.

The electric drive vehicle 100 including a secondary battery cooling system 80 according to an embodiment of the present invention mounted thereon will be first described. As illustrated in FIG. 1, the electric drive vehicle 100 includes a drive mechanism storage space 110 in a front portion, a vehicle interior 102 at the center, and a luggage space 103 in a rear portion of the vehicle. The drive mechanism storage space 110 in the front portion stores therein a motor generator 18 which drives wheels 105 and 106, and a PCU 111 which boosts direct-current voltage supplied from a battery 10 and converts the boosted direct-current voltage to alternating-current electric power for driving the motor generator 18. The vehicle interior 102 at the center includes a front seat 107 and a rear seat 108 mounted therein. In front of a driver's seat of the front seat 107, a steering wheel 109 and an ignition switch 20 are mounted. In the luggage space 103 located at the rear portion of the vehicle, the battery 10 which supplies driving power to the motor generator 18 is provided. In this example, the battery 10 is a nickel metal hydride battery which is a chargeable and dischargeable secondary battery, and is stored in a casing 53. Above the casing 53, an electrically operated cooling fan 40 which supplies cooled air to the battery 10 is mounted. The electrically operated cooling fan 40 has an inlet port to which a suction duct 51 for drawing air from the vehicle interior 102 is connected, and an outlet port to which a connection duct 52 for sending air to the casing 53 of battery 10 is connected. The electrically operated cooling fan 40 draws air within the vehicle interior 102 through the suction duct 51 and supplies the air through the connection duct 52 to the casing 53 of the battery. Exhaust air which has cooled the battery 10 is discharged from an exhaust duct 54 of the casing 53 to the luggage space 103, and is thereafter returned into the vehicle interior 102 through an opening formed in a partition 104 which separates the luggage space 103 and the vehicle interior 102. As the air within the vehicle interior 102 is controlled at a predetermined temperature by an air conditioner which is not shown, even when the exhaust air having a temperature that has risen as a result of cooling the battery 10 is returned from the luggage space 103 to the vehicle interior 102, the temperature of the vehicle interior 102 is maintained at the predetermined temperature. In the vehicle interior 102 (under the front seat, for example), a control unit 70 which controls driving of the electrically operated cooling fan 40 and the whole electric drive vehicle 100 is mounted.

Figure 2:
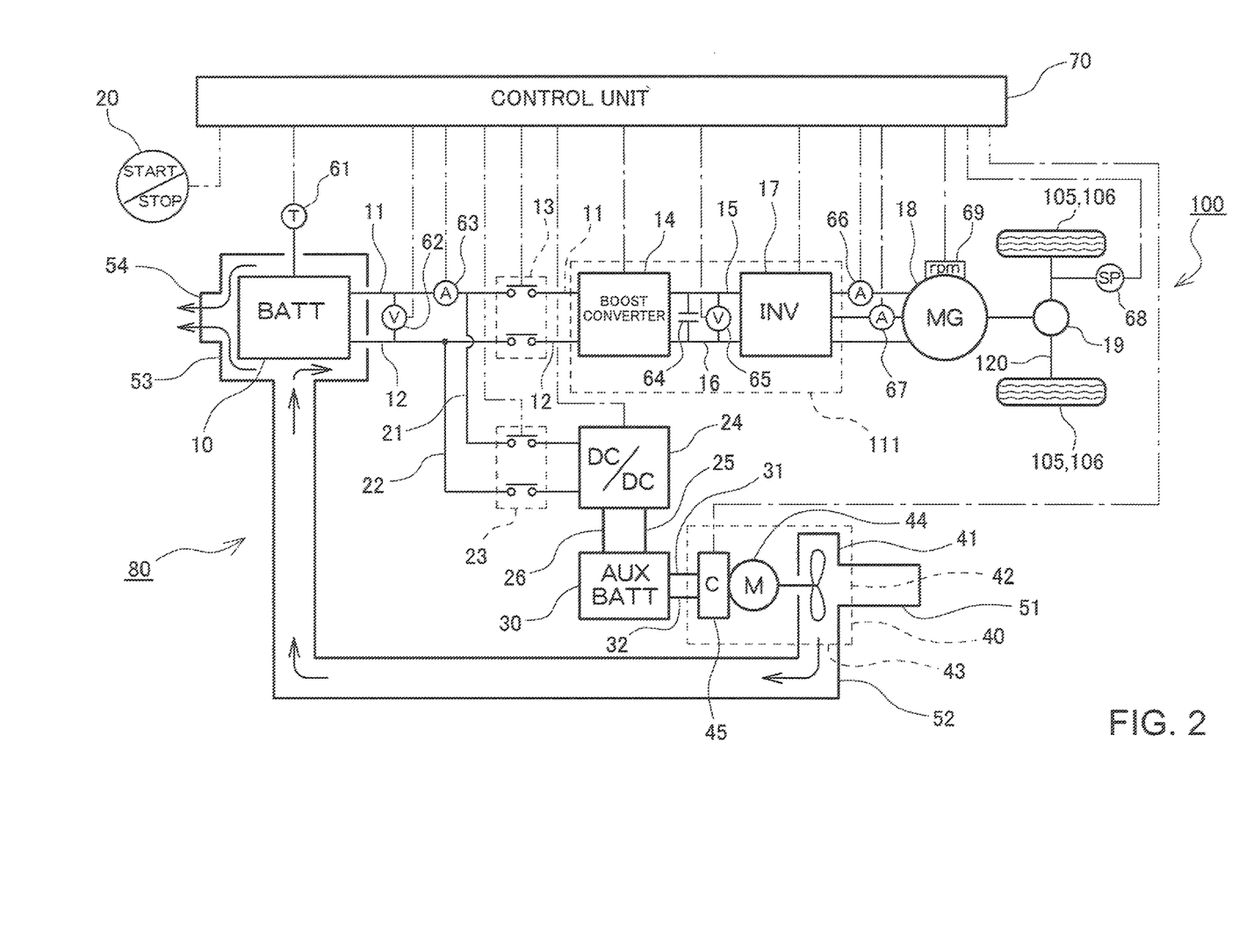
FIG. 2 is a system diagram of a secondary battery cooling system according to the embodiment of the present invention and an electric drive vehicle on which the secondary battery cooling system is mounted.

Referring now to FIG. 2, a system structure of the electric drive vehicle 100 including the secondary battery cooling system 80 according to the present embodiment mounted therein will be described. In FIG. 2, dashed and single-dotted lines denote signal lines. The battery 10 for driving the vehicle is connected via a positive-side bus bar 11 and a negative-side bus bar 12 to a positive-side input terminal and a negative-side input terminal of a system main relay 13, respectively. A positive-side output terminal and a negative-side output terminal of the system main relay 13 are connected respectively via the positive-side bus bar 11 and the negative-side bus bar 12 to a boost converter 14. A positive-side output terminal and a negative-side output terminal of the boost converter 14 are connected, via a high-voltage positive-side bus bar 15 and a high-voltage negative-side bus bar 16, to a positive-side input terminal and a negative-side input terminal of an inverter 17, respectively. Between the boost converter 14 and the inverter 17, a smoothing capacitor 64 which smooths an output voltage of the boost converter 14 and supplies the smoothed voltage to the inverter 17 is connected. The boost converter 14, the inverter 17, and the smoothing capacitor 64 constitute the PCU 111. Three output bus bars of U-phase, V-phase, and W-phase are connected to the inverter 17, and the output bus bars are connected to input terminals of the respective phases of the motor generator. An output shaft of the motor generator 18 drives the wheels 105 and 106 via a gear mechanism 19 and an axle 120. To the axle 120, a vehicle speed sensor 68 which detects the vehicle speed from the rotational speed is attached.

The positive-side bus bar 11 and the negative-side bus bar 12 connected to the battery 10 branch to a positive-side bus bar 21 and a negative-side bus bar 22, respectively. These bus bars 21 and 22 are connected to a positive-side input terminal and a negative-side input terminal of a system main relay 23, respectively. A positive-side output terminal and a negative-side output terminal of the system main relay 23 are connected, via the positive-side bus bar 21 and the negative-side bus bar 22, respectively, to a DC/DC converter 24. An output of the DC/DC converter 24 is connected, via a positive-side low-voltage bus bar 25 and a negative-side low-voltage bus bar 26, to an auxiliary battery 30. The auxiliary battery 30 is connected via output lines 31 and 32 to the electrically operated cooling fan 40. The electrically operated cooling fan 40 is composed of a fan body 41 storing an impeller therein, a direct-current motor 44 which drives the impeller, and a control unit 45 which controls the velocity of the direct-current motor 44. The output lines 31 and 32 of the auxiliary battery 30 are connected to the control unit 45. The fan body 41 has an inlet port 42 to which the suction duct 51 which draws cooled air from the vehicle interior 102 is connected, and an outlet port 43 to which the connection duct 52 for supplying the cooled air to the casing 53 of the battery 10 is connected. The air which has cooled the battery 10 stored in the casing 53 is discharged from the exhaust duct 54 into the luggage space 103. The electrically operated cooling fan 40 and the ducts 51, 52, and 54, and the casing 53 constitute a cooling mechanism for cooling the battery 10.

A temperature sensor 61 for detecting the temperature of the battery 10 is attached to the battery 10. A voltage sensor 62 for detecting a voltage of the battery 10 is also connected between the positive-side bus bar 11 and the negative-side bus bar 12 connected to the battery 10. A current sensor 63 for detecting charging and discharging current of the battery 10 is mounted on the positive-side bus bar 11 between the battery 10 and the system main relay 13. A voltage sensor 65 for detecting the output voltage of the boost converter 14 is further mounted between the high-voltage positive-side bus bar 15 and the high-voltage negative-side bus bar 16, between the smoothing capacitor 64 and the inverter 17. On two of the three bus bars connecting the inverter 17 and the motor generator 18, current sensors 66 and 67 for measuring the current between the inverter 17 and the motor generator 18 are mounted, respectively. A resolver 69 for detecting the number of revolutions and the rotation angle of a rotor is further attached on the motor generator 18. Further, as described above with reference to FIG. 1, the ignition switch 20 which actuates and stops the electric drive vehicle 100 is mounted in the vehicle interior 102.

As illustrated in FIG. 2, the system main relays 13 and 23, the boost converter 14, the inverter 17, the DC/DC converter 24, and the control unit 45 of the electrically operated cooling fan 40 are connected to the control unit 70 and operate according to instructions from the control unit 70. The ignition switch 20, the temperature sensor 61, the voltage sensors 62 and 65, the current sensors 63, 66, and 67, the resolver 69, and the vehicle speed sensor 68 are also connected to the control unit 70, and an on/off signal of the ignition switch 20, and detection signals from the sensors 61 to 68 and the resolver 69 are input to the control unit 70. The control unit 70 is a computer including therein a CPU which performs operation processing and signal processing, and a storage unit storing control data, controlling maps, programs, and the like.

The basic operation of the electric drive vehicle 100 configured as described above will be briefly described. When the ignition switch 20 is turned on, the system main relays 13 and 23 are turned on. When the electric drive vehicle 100 performs power running, direct-current electric power of the battery 10 is boosted by the boost converter 14 to obtain high-voltage direct-current electric power, and the high-voltage direct-current electric power is then converted to three-phase alternating-current electric power to drive the motor generator 18. When the electric drive vehicle 100 performs braking, the motor generator 18 is caused to function as a power generator, and the alternating-current electric power generated by the motor generator 18 is converted to high-voltage direct-current electric power by the inverter 17, and is reduced by the boost converter 14 to a voltage substantially the same as the voltage of the battery 10 to charge the battery 10. Further, when the temperature of the battery 10 exceeds a predetermined temperature, the electrically operated cooling fan 40 is driven by power supplied from the auxiliary battery 30 for cooling the battery 10. When the voltage of the auxiliary battery 30 is lowered, the voltage of the battery 10 is decreased to the voltage (12V or 24V) of the auxiliary battery 30 by the DC/DC converter 24 and supplied to the auxiliary battery 30 for charging the auxiliary battery 30. When the ignition switch 20 is turned off, the system main relays 13 and 23 are also turned off, thereby disconnecting the battery 10 from the boost converter 14 and the DC/DC converter 24.

In the electric drive vehicle 100, the temperature sensor 61 for detecting the temperature of the battery 10, the electrically operated cooling fan 40 constituting the cooling mechanism for cooling the battery 10, and a portion of the control unit 70 which stops driving of the electrically operated cooling fan 40 constitute a secondary battery cooling system 80. The secondary battery cooling system 80 may include the voltage sensor 62 for detecting the voltage of the battery 10, the current sensor 63 for detecting the charging and discharging current of the battery 10, and the ignition switch 20.

The charge and discharge reaction and the oxygen generating reaction and the oxygen absorbing reaction, which are side reactions of the charge and discharge reaction, of a nickel metal hydride battery, will now be briefly described.

In a "negative electrode" of a nickel metal hydride battery, "during discharge", hydrogen atoms (metal hydride MH) stored in a hydrogen storing alloy (M) and hydroxide ions (OH$^-$) change to water (H$_2$O) by catalysis of the electrode and simultaneously electrons (e$^-$) are emitted (see (Formula 1)).

$$MH+OH^-\rightarrow M+H_2O+e^- \qquad \text{(Formula 1)}$$

A "positive electrode" receives the electrons (e$^-$) emitted by the negative electrode. In the positive electrode, water (H$_2$O) and nickel oxyhydroxide (NiOOH) react to generate nickel hydroxide (Ni(OH)$_2$) and a hydroxide ion (OH$^-$) (see (Formula 2)).

$$NiOOH+H_2O+e^-\rightarrow Ni(OH)_2+OH^- \qquad \text{(Formula 2)}$$

The reaction "during charge" is completely opposite to the reaction "during discharge". "During charge", in the "positive electrode", a hydroxide ion (OH$^-$) and nickel hydroxide (Ni(OH)$_2$) of the electrode react, such that nickel hydroxide (Ni(OH)$_2$) changes to nickel oxyhydroxide (NiOOH) to generate water (H$_2$O) and also emit electrons (e$^-$) (see (Formula 3)).

$$Ni(OH)_2+OH^-\rightarrow NiOOH+H_2O+e^- \qquad \text{(Formula 3)}$$

The "negative electrode" receives the electrons (e$^-$) emitted by the positive electrode, and decomposes water (H$_2$O) into a hydrogen ion (H$^+$) and a hydroxide ion (OH$^-$) by catalysis of the electrode (see (Formula 4)). The hydrogen ion (H$^+$) receives electrons (e$^-$) from the electrode (negative electrode) and changes to a hydrogen atom (Ha) (see (Formula 5)). The hydrogen atom (H(a)) is stored in the hydrogen storing alloy (M), which is a negative electrode, as metal hydride MH (see (Formula 6)).

$$H_2O \rightarrow H^+ + OH^- \quad \text{(Formula 4)}$$

$$H^+ + e^- \rightarrow H(a) \quad \text{(Formula 5)}$$

$$H(a) + M \rightarrow MH \quad \text{(Formula 6)}$$

The reactions in Formula 4 to Formula 6 above are combined as the following reaction in Formula 7 below.

$$M + H_2O + e^- \rightarrow MH + OH^- \quad \text{(Formula 7)}$$

Further, in a nickel metal hydride battery, as the side reactions of the charge and discharge reactions shown in Formula 1 to 7 described above, an oxygen generating reaction (Formula 8) in which oxygen gas is generated in the positive electrode, and an oxygen absorbing reaction (Formula 9) in which the oxygen gas generated in the positive electrode reacts with hydrogen on a negative electrode surface and returns to water, occur.

$$OH^- \rightarrow \tfrac{1}{4}O_2 + \tfrac{1}{2}H_2O + e^- \quad \text{(Formula 8)}$$

$$MH + \tfrac{1}{4}O_2 \rightarrow M + \tfrac{1}{2}H_2O \quad \text{(Formula 9)}$$

As a certain amount of time is necessary for the oxygen gas generated in the positive electrode to reach the negative electrode, the oxygen absorbing reaction in the negative electrode occurs belatedly after the oxygen generating reaction in the positive electrode. There is therefore a possibility that, when charge and discharge of a nickel metal hydride battery stops, the oxygen gas which has not been incorporated into the negative electrode will remain within the battery. The oxygen gas remaining within the battery is incorporated into the negative electrode by the oxygen absorbing reaction after the stop of charge and discharge. The oxygen absorbing reaction is a slow heat-generating reaction.

Referring to FIGS. 4A to 4E, changes with respect to time, in the speed SP of the electric drive vehicle 100, the charging current IC to the battery 10, the amount of generated oxygen in the positive electrode of the battery 10, the amount of absorbed oxygen in the negative electrode, and the battery temperature TB, from the time when the electric drive vehicle 100 stops until the ignition switch 20 is turned off, and, after the ignition switch 20 is turned off in a case where the electrically operated cooling fan 40 is stopped when the ignition switch 20 is turned off, will be described.

Figure 4A:
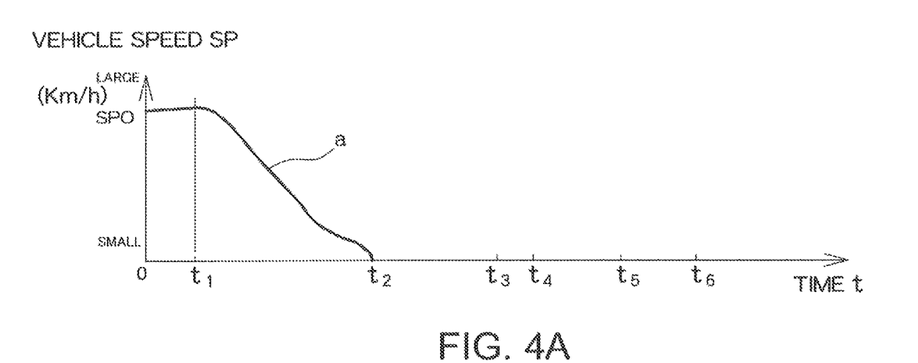
FIG. 4A is a graph showing a change in the vehicle speed of the electric drive vehicle illustrated in FIG. 1 with respect to time.
Figure 4B:
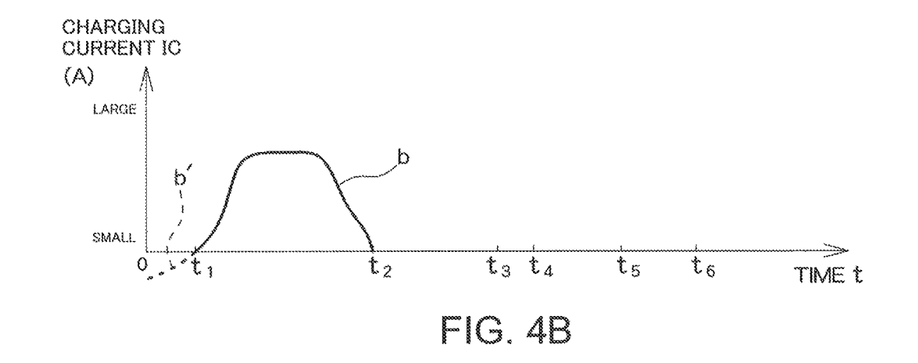
FIG. 4B is a graph showing a change in the charging current of a battery of the electric drive vehicle illustrated in FIG. 1 with respect to time.
Figure 4C:
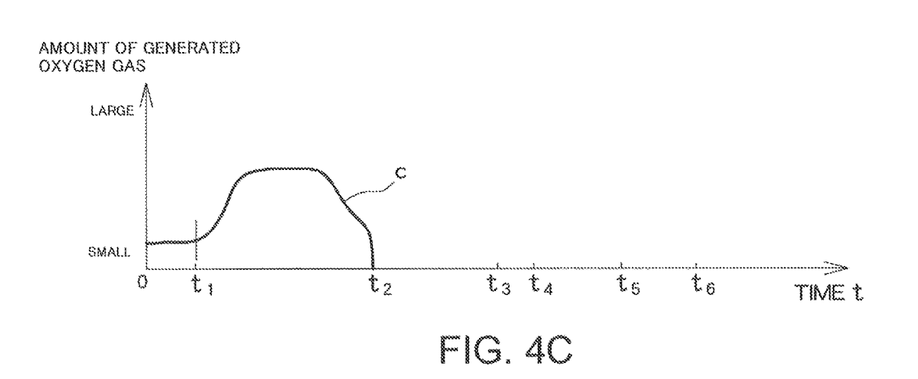
FIG. 4C is a graph showing a change in the amount of oxygen gas generated in a positive electrode of a battery mounted on the electric drive vehicle illustrated in FIG. 1 with respect to time.
Figure 4D:
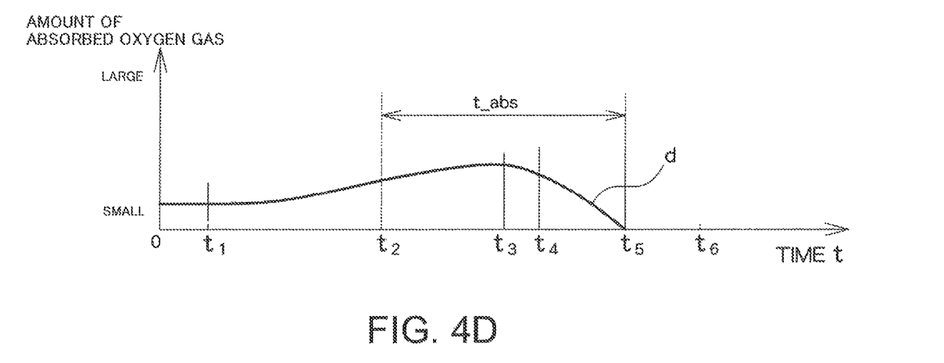
FIG. 4D is a graph showing a change in the amount of oxygen gas absorbed in a negative electrode of a battery mounted on the electric drive vehicle illustrated in FIG. 1 with respect to time.
Figure 4E:
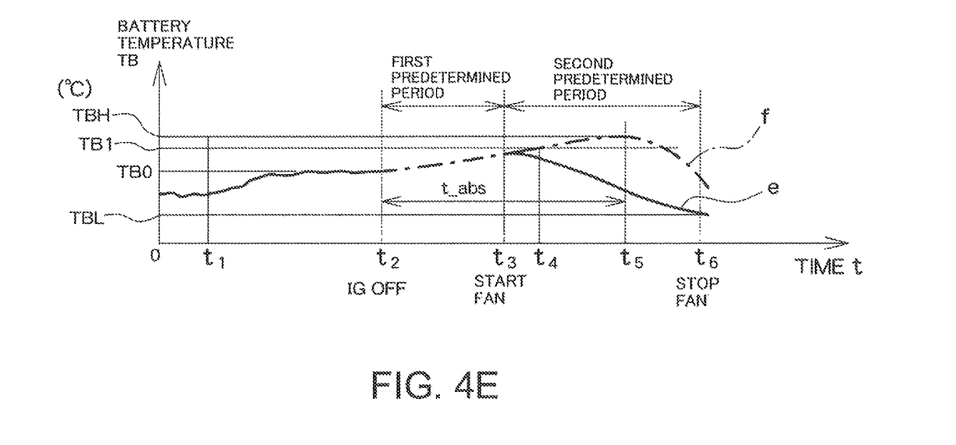
FIG. 4E is a graph showing a change in the temperature of a battery mounted on the electric drive vehicle illustrated in FIG. 1 with respect to time.

In the initial state at time 0 in FIGS. 4A to 4E, the electric drive vehicle 100 is in a state in which the motor generator 18 is driven by electric power of the battery 10 and is performing power running at a vehicle speed SP0, as indicated by line "a" in FIG. 4A. In this case, as indicated by dashed line b' in FIG. 4B, the charging current IC to the battery 10 is negative. As shown in FIGS. 4C and 4D, as a change in the charging current IC of the battery 10 is small in the vicinity of time 0, the amount of the oxygen gas generated in the positive electrode and the amount of the oxygen gas absorbed in the negative electrode are substantially the same, and therefore almost all the oxygen gas generated in the positive electrode is absorbed in the negative electrode, resulting in a state in which substantially no oxygen gas remains in the battery. As shown in FIG. 4E, the temperature of the battery 10 at time 0 is TB0, and the battery 10 is being cooled by the electrically operated cooling fan 40.

During a period from time 0 to time t1, as the amount of depression of an accelerator pedal by a driver is gradually reduced, the output power of the battery 10 is reduced, and, as indicated by dashed line b' in FIG. 4B, the charging current IC to the battery 10 accordingly approaches 0 from the negative side. When the driver steps on the brake pedal at time t1, regenerative braking in which the motor generator 18 function as a power generator is applied, and alternating-current electric power generated by the motor generator 18 is converted by the inverter 17 into direct-current electric power to charge the battery 10. Consequently, after time t1, the charging current IC to the battery 10 gradually increases as indicated by line b in FIG. 4B. As the charging current IC to the battery 10 increases, as indicated by line c in FIG. 4C, the amount of the oxygen gas generated in the positive electrode increases. As described above, as it takes a certain amount of time for the oxygen gas generated by the positive electrode to reach the negative electrode, the oxygen absorbing reaction in the negative electrode occurs belatedly after the oxygen generating reaction in the positive electrode. Accordingly, as illustrated in FIG. 4D, the amount of the oxygen gas absorbed in the negative electrode, unlike the amount of the oxygen gas generated in the positive electrode, does not increase in synchronism with the increase in the charging current IC, but gently increases from time t1.

As indicated by line "a" in FIG. 4A, after time t1, the vehicle speed SP of the electric drive vehicle 100 slows from SP0. As the reduction in the vehicle speed SP of the electric drive vehicle 100 also causes a reduction in the required braking force, the regenerated power is also lowered, and as indicated by line "b" in FIG. 4B, the charging current IC to the battery 10 also decreases. Accordingly, as indicated by line "c" in FIG. 4C, the amount of the oxygen gas generated in the positive electrode also decreases. On the other hand, as the oxygen gas which has been generated by the positive electrode reaches the negative electrode, the oxygen absorbing reaction continues, and as indicated by line "d" in FIG. 4D, the amount of oxygen gas absorbed in the negative electrode continues to increase from time t1 to time t2.

The electric drive vehicle 100 stops at time t2 shown in FIG. 4A, and the ignition switch 20 is turned off. This causes the system main relays 13 and 23 to be turned off so that the battery 10 is disconnected from the boost converter 14 and the DC/DC converter 24 and the charging current IC becomes 0. As the battery 10 is disconnected from the system, the power discharged from the battery 10 also becomes 0. Thus, as the charging current IC to the battery 10 and the discharging current from the battery 10 is 0 so that the battery 10 is placed in a charge and discharge suspension state, the charge and discharge reactions represented in Formulas 1 to 7 described above are stopped. However, at time t2, a part of the oxygen gas generated by the positive electrode before time t2 has not reached the negative electrode and remains unabsorbed by the negative electrode. This results in a state in which the oxygen gas generated by the positive electrode immediately before time t2 remains within the battery 10. Due to this remaining oxygen gas, after time t2 at which the charge and discharge reactions of the battery 10 stop, the oxygen absorbing reaction as described in Formula 9 continues to occur within the battery, and as indicated by line "d" in FIG. 4D, the amount of the absorbed oxygen in the negative electrode continues to increase slowly. As the oxygen absorbing reaction is a slow reaction of heat generation, if the electrically operated cooling fan 40 is stopped at time t2 when the ignition switch 20 is turned off, the battery temperature TB gradually rises from the temperature TB0 at time t2, as indicated by dashed and single-dotted line "f" in FIG. 4E.

The oxygen absorbing reaction by the negative electrode continues until all of the oxygen gas remaining within the battery 10 when the ignition switch 20 is turned off is absorbed by the negative electrode. As the amount of the oxygen gas absorbed by the negative electrode increases with the amount of oxygen gas remaining within the battery 10, as shown in FIG. 4D, the amount of the oxygen gas absorbed by the negative electrode continues to increase after time t2, reaches the maximum at time t3, and thereafter decreases to reach 0 at time t5. At time t5, all the oxygen gas remaining within the battery 10 at time t2 is completely absorbed by the negative electrode.

After time t2, if the electrically operated cooling fan 40 is stopped to stop cooling the battery 10, the battery temperature TB continues to rise gently until time t5 at which all the remaining oxygen gas is absorbed by the negative electrode and reaches the peak temperature TBH, as indicated by dashed and single-dotted line "f" in FIG. 4E. After time t5, as there is no heat generation due to the oxygen absorbing reaction, the battery temperature TB is gradually lowered by natural heat discharge and reaches the vicinity of temperature TB0 at time t6.

Referring now to FIGS. 3 to 6, operations of the secondary battery cooling system 80 for cooling the battery 10, which is a nickel metal hydride battery, and the electric drive vehicle 100 on which the secondary battery cooling system 80 is mounted, will be described.

Figure 3:
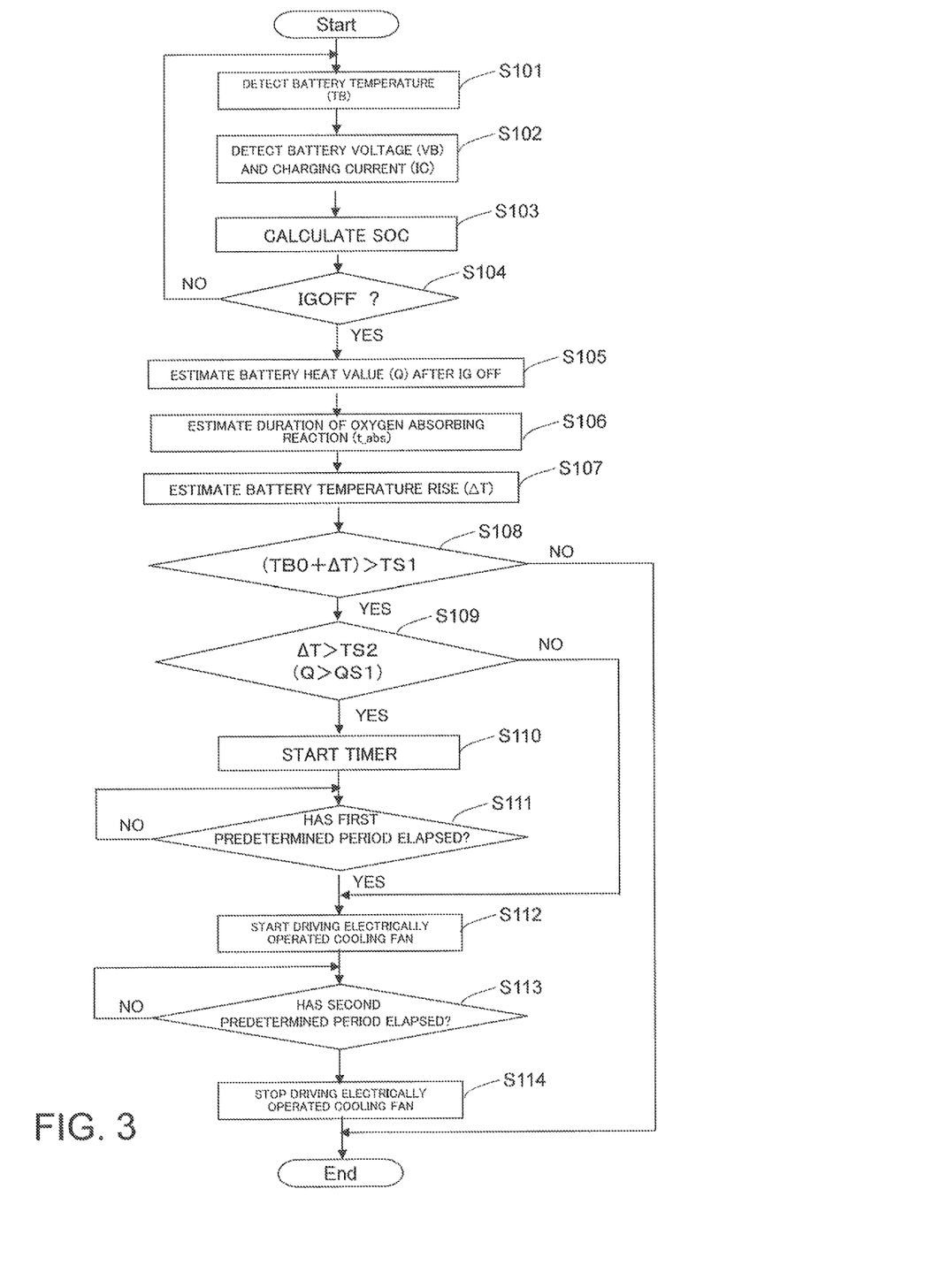
FIG. 3 is a flowchart illustrating an operation of the secondary battery cooling system according to the embodiment of the present invention.

The control unit 70, as shown by step S101 in FIG. 3, detects the temperature TB of the battery 10 using the temperature sensor 61, and, as shown by step S102 in FIG. 3, detects voltage VB and the charging current IC of the battery 10 using the voltage sensor 62 and the current sensor 63, and as shown by step S103 in FIG. 3, calculates the remaining capacity (SOC) of the battery 10 from the detected voltage VB and charging current IC of the battery 10, using a map stored in a storage unit of the control unit 70. The remaining capacity (SOC) of the battery 10 may be detected by a signal from a remaining capacity (SOC) sensor mounted on the battery 10, rather than calculation based on the voltage VB and the charging current IC as described above. The voltage VB, the charging current IC, and the remaining capacity (SOC) are stored in the storage unit of the control unit 70. As shown by step S104 in FIG. 3, if the electric drive vehicle 100 is traveling and the ignition switch 20 is not turned off, such as during the time period from time 0 to time t1 in FIGS. 4A to 4E, the process returns to step S101 and the control unit 70 continues monitoring the voltage VB, the charging current IC, and the remaining capacity (SOC) of the battery 10, and repeats the operation of storing detected data in the storage unit.

If the electric drive vehicle 100 stops and the ignition switch 20 is turned off at time t2 shown in FIGS. 4A to 4E, the control unit 70 determines YES in step S104 in FIG. 3 and the process proceeds to step S105 in FIG. 3, where the control unit 70 estimates a heat value Q of the battery 10 after the ignition switch 20 is turned off.

Figure 5:
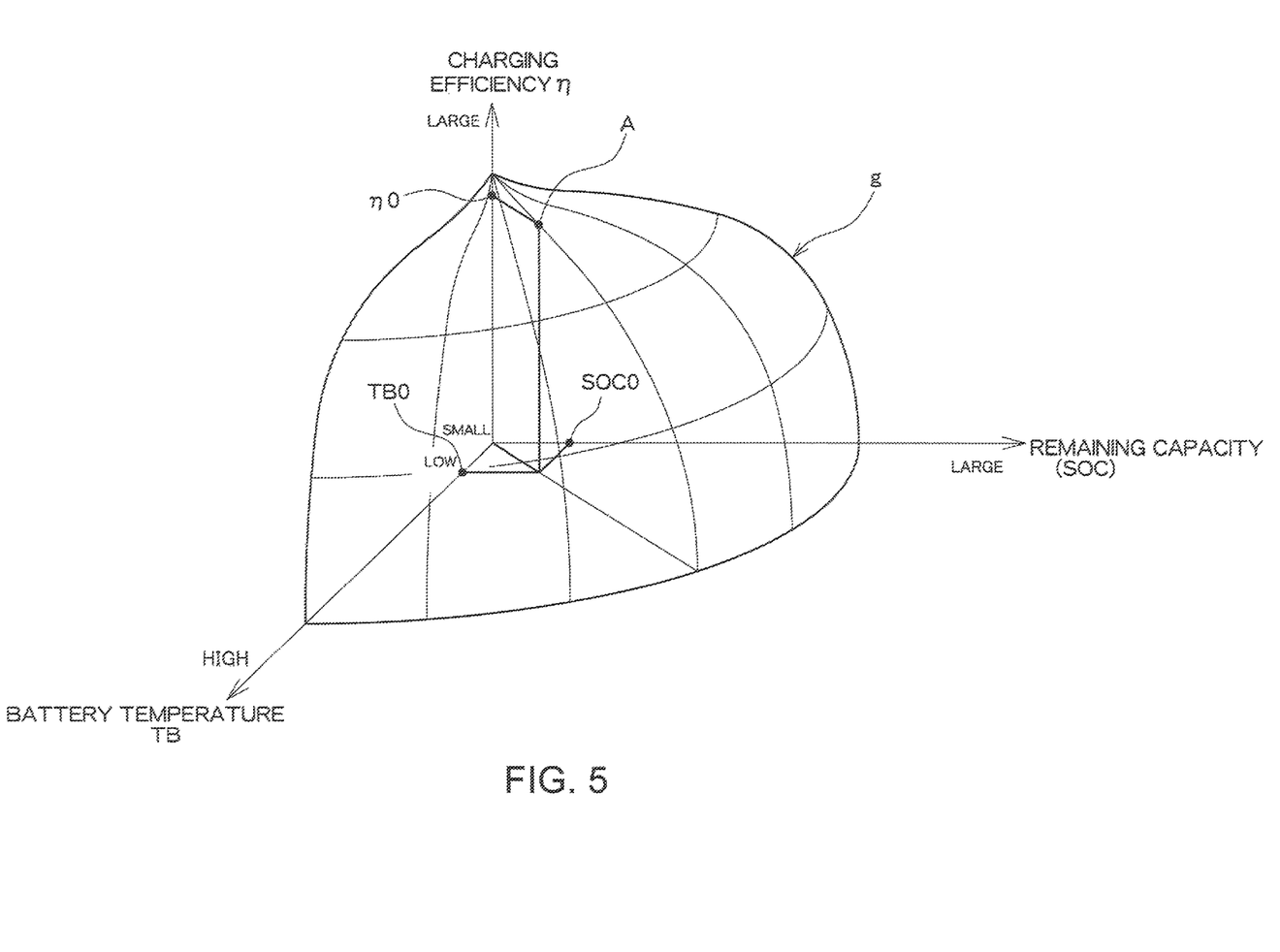
FIG. 5 is a map showing a change in the charging efficiency with respect to the remaining capacity (SOC) and the temperature of a battery mounted on the electric drive vehicle illustrated in FIG. 1.

Among various methods for estimating the heat value of the battery 10, one example estimation method will be described below. Using the battery temperature TB and the remaining capacity (SOC) of battery 10 before time t2 which are detected from step S101 through step S103 in FIG. 3 and stored in the storage unit, and a map of the remaining capacity (SOC), the battery temperature TB, and the charging efficiency η of the battery 10 shown in FIG. 5, the control unit 70 calculates the charging efficiency η of the battery 10 before time t2. As illustrated in FIG. 5, the charging efficiency η is represented as a surface g in a three-dimensional space in which the remaining capacity (SOC) and the battery temperature TB are XY axes and the charging efficiency η is a Z axis, and in the case where the remaining capacity (SOC) is SOC0 and the temperature TB is TB0, a point A on the surface g indicates the charging efficiency η. In this case, the charging efficiency η is η0. Further, as illustrated in FIG. 5, as the remaining capacity (SOC) is larger and the battery temperature TB is higher, the charging efficiency η is lower.

Figure 6:
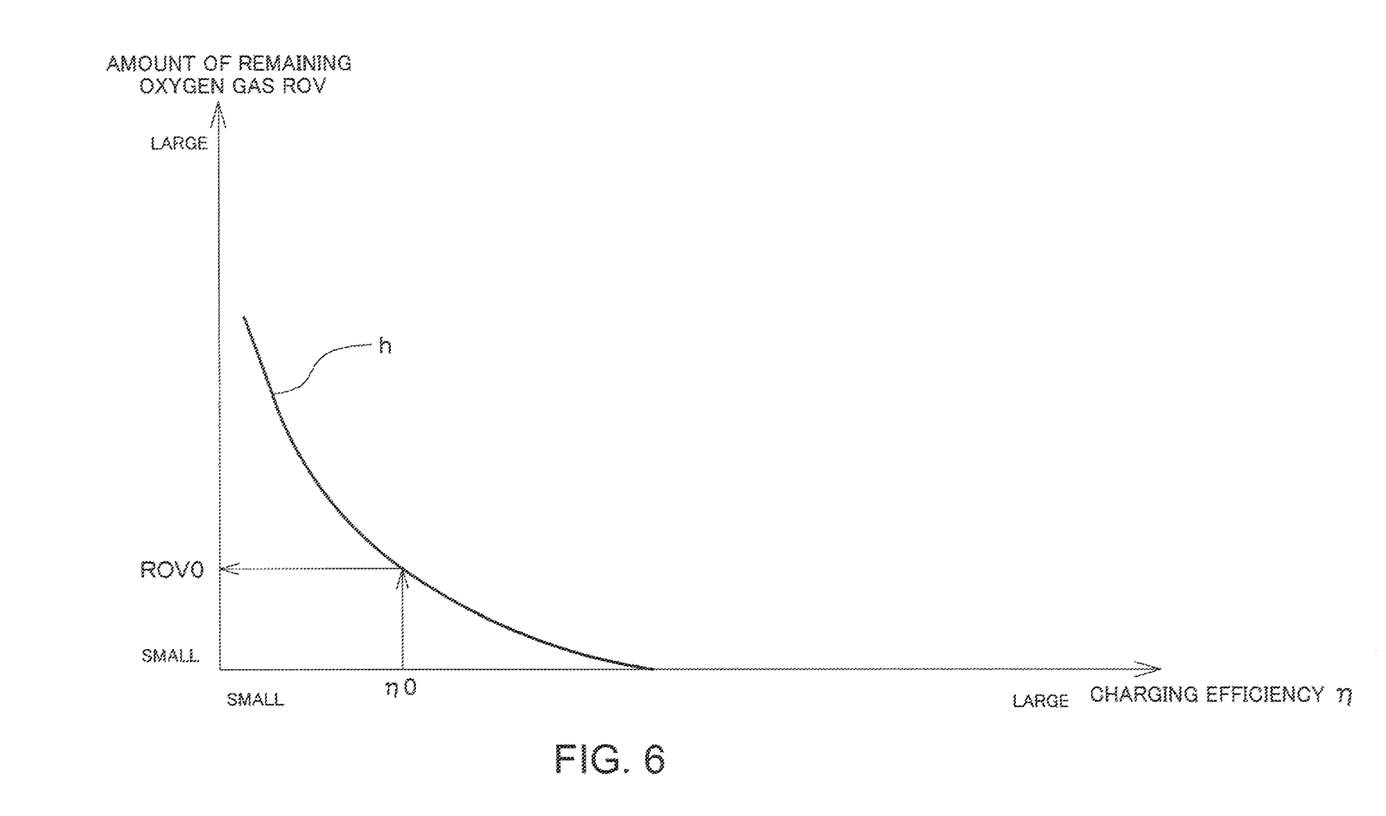
FIG. 6 is a map showing a relationship of the amount of remaining oxygen gas with respect to the charging efficiency of a battery mounted on the electric drive vehicle illustrated in FIG. 1.

The amount of the oxygen gas ROV remaining in the battery 10 when charge and discharge of battery 10 is stopped varies with the charging efficiency η, and has a characteristic in which, if the charging efficiency η is small, the amount of remaining oxygen gas ROV is great, as indicated by line h in FIG. 6. As illustrated in FIG. 6, if the charging efficiency η is η0, the amount of remaining oxygen gas ROV is ROV0. The control unit 70 obtains the charging efficiency η of the battery 10 using the map shown in FIG. 5, and estimates the amount of remaining oxygen gas ROV within the battery 10 when battery 10 stops charge and discharge, that is, when the ignition switch 20 is turned off and the system main relays 13 and 23 are turned off, using the map shown in FIG. 6. As all the oxygen gas remaining within the battery 10 when the battery 10 stops charge and discharge is completely absorbed by the negative electrode with the subsequent oxygen absorbing reaction of the negative electrode as described above, the heat value Q of the battery 10 after the ignition switch 20 is turned off can be obtained by multiplying the amount of remaining oxygen gas ROV by a heat of reaction.

The control unit 70 further estimates a duration (t_abs) of the oxygen absorbing reaction in the negative electrode, as shown by step S106 in FIG. 3. The amount of oxygen gas absorbed by the negative electrode per unit time varies depending on the temperature of the battery 10: if the battery temperature TB is high, the amount of oxygen gas absorbed by the negative electrode per unit time is great, and if temperature TB is low, the amount of oxygen gas absorbed by the negative electrode per unit time is small. Therefore, the control unit 70 estimates the amount of oxygen gas absorbed by the negative electrode per unit time based on the battery temperature TB when the ignition switch 20 is stopped. The control unit 70 then estimates, in step S106 in FIG. 3, the duration (t_abs) of the oxygen absorbing reaction in the negative electrode by dividing the amount of remaining oxygen gas ROV obtained based on FIGS. 5 and 6 by the amount of absorbed oxygen gas per unit time.

As shown in step S107 in FIG. 3, the control unit 70 further estimates a temperature rise ΔT of the battery 10 after the ignition switch 20 is stopped. The control unit 70 can estimate the average heat value of the battery 10 per unit time by dividing the heat value Q of the battery 10 which is estimated in step S105 by the duration (t_abs) of the oxygen absorbing reaction in the negative electrode which is estimated in step S106. The control unit 70 has stored in the storage unit a map of the temperature rise ΔT obtained by consideration of an amount of natural heat discharge of the battery 10 with the average heat value per unit time which is estimated, and estimates the temperature, rise ΔT of the battery when the electrically operated cooling fan 40 is stopped, using this map. The temperature rise ΔT is a difference between the battery temperature TB0 at time t2 in FIG. 4E and the battery temperature TB at time t5 when the oxygen absorbing reaction in the negative electrode terminates. That is, ΔT=(TBH−TB0). Further, the duration (t_abs) of the oxygen absorbing reaction is a period between time t5 and time t2. That is, (t_abs)=(time t5−time t2).

The control unit 70 then calculates a temperature by adding the temperature rise ΔT of the battery to the battery temperature TB0 when the ignition switch 20 is turned off, as shown in step S108 in FIG. 3. As described above, as the relation ΔT=(TBH−TB0) is equal to the relation (TB0+ΔT)=TBH, the above calculation corresponds to a calculation of the maximum increased temperature of the battery 10 in a case where the electrically operated cooling fan 40 is stopped when the ignition switch 20 is turned off. As shown in step S108 of FIG. 3, the control unit 70 compares (TB0+ΔT) with the upper limit temperature TS1 (predetermined temperature) which does not cause deterioration or the like of the battery 10, and, if it is determined that (TB0+ΔT) exceeds the upper limit temperature TS1, that is, ((TB0+ΔT)>TS1), determines that cooling of the battery 10 is necessary after the ignition switch 20 is turned off and the process proceeds to step S109 shown in FIG. 3. On the other hand, if it is determined, in step S108 in FIG. 3, that (TB0+ΔT) does not exceed the upper limit temperature TS1, that is, ((TB0+ΔT)≤TS1), the control unit 70 then determines that it is not necessary to cool the battery 10 after the ignition switch 20 is turned off, and terminates the operation without driving the electrically operated cooling fan 40.

The control unit 70 further determines, in step S109 in FIG. 3, whether or not the temperature rise ΔT of the battery 10 exceeds a threshold value temperature TS2. As, in this case, the relationship of (TB0+ΔT)>TS1 in step S108 in FIG. 3 has already been satisfied, this case corresponds to a case in which the relationship of TB0>(TS1−ΔT) is satisfied and the temperature TB0 of battery 10 when the ignition switch 20 is turned off is lower than the upper limit temperature TS1(TB0<TS1) of the battery 10. In other words, this corresponds to a case where, while the battery temperature TB is lower than the upper limit temperature TS1 for which cooling is necessary (TB0<TS1) when the ignition switch 20 is turned off, with the subsequent temperature rise, the battery temperature TB would exceed the upper limit temperature TS1. If the temperature rise ΔT is great, the battery temperature TB, when the ignition switch 20 is turned off, is much lower than the upper limit temperature TS1, and would not exceed the upper limit temperature TS1 immediately, and would therefore reach the upper limit temperature TS1 later. If ΔT is small, on the other hand, the battery temperature TB0 when the ignition switch 20 is turned off is close to the upper limit temperature TS1, and would likely to reach the upper limit temperature TS1 immediately after the ignition switch 20 is turned off. Accordingly, the control unit 70, if the temperature rise ΔT of the battery 10 exceeds the temperature TS2(ΔT>TS2), determines that the battery temperature TB when the ignition switch 20 is turned off is much lower than the upper limit temperature TS1 and would not therefore reach the upper limit temperature TS1 immediately, and the process proceeds to step S110 in FIG. 3 where a timer is started. As shown in step S111 in FIG. 3, the control unit 70 does not drive the electrically operated cooling fan 40 until a first predetermined time period has elapsed, and after the first predetermined time period has elapsed, the process proceeds to step S112 in FIG. 3 where the control unit 70 starts driving the electrically operated cooling fan 40. In other words, the control unit 70 defers start of driving the electrically operated cooling fan 40 from the time point at which the ignition switch 20 is turned off by an amount corresponding to the first predetermined time period. The first predetermined time period may be a period from time t2 at which the ignition switch 20 is turned off to time t3, which is slightly before time t4 in FIG. 4E at which it is assumed that the battery temperature TB reaches the upper limit temperature TS1, for example. The first predetermined period may be determined by an experiment and the like, as appropriate. When the electrically operated cooling fan 40 is actuated at time t3 in FIG. 4E, the battery temperature TB stars falling after time t3, as indicated by solid line e in FIG. 4E.

Once the electrically operated cooling fan 40 is actuated, the control unit 70 continues to drive the electrically operated cooling fan 40 until a second predetermined period has elapsed, as shown by step S113 in FIG. 3. The second predetermined period may be, for example, a period from time t3 at which the electrically operated cooling fan 40 starts to time t6 which is some extra time past time t5 at which the oxygen absorbing reaction in the negative electrode of the battery 10 terminates, as illustrated in FIGS. 4D and 4E. As illustrated in FIG. 4E, at time t6, the battery temperature TB falls to TBL. Once the second predetermined period has elapsed, the process proceeds to step S114 in FIG. 3, and the control unit 70 stops the electrically operated cooling fan 40.

If the temperature rise ΔT of the battery 10 does not exceed the threshold value temperature TS2(ΔT≤TS2), on the other hand, the control unit 70 determines that, while the battery temperature TB0 is less than the upper limit temperature TS1(TB0<TS1) when the ignition switch 20 is stopped, the battery temperature TB0 is close to the upper limit temperature TS1 and would reach the temperature TS1 immediately, and the process jumps from step S109 to step S112 in FIG. 3, where the control unit 70 starts driving the electrically operated cooling fan 40. In other words, the control unit 70 restarts the electrically operated cooling fan 40 immediately after turning the ignition switch 20 off. In this case, the electrically operated cooling fan 40 may continue to be operated even when the ignition switch 20 is turned off, rather than being temporarily stopped.

As the temperature rise ΔT of the battery 10 when the ignition switch 20 is turned off is substantially proportional to the heat value Q of the battery 10 when the ignition switch 20 is turned off, the control unit 70, for determination in step S109 in FIG. 3, may compare the heat value Q of the battery 10 with a predetermined heat value QS1, rather than comparing the temperature rise ΔT with the threshold temperature TS2, to thereby determine YES or NO in step S109. In this case, if the heat value Q of the battery 10 exceeds the threshold heat value QS1(Q>QS1), the control unit 70, determining that the battery temperature TB is lower than the upper limit temperature TS1 at which cooling is necessary (TB0<TS1) and would not reach the upper limit temperature TS1 immediately, defers start of driving the electrically operated cooling fan 40 by an amount corresponding to the first predetermined period. If the heat value Q of the battery 10 does not exceed the threshold heat value QS1 (Q≤QS1), determining that while the battery temperature TB is lower than the upper limit temperature TS1 at which cooling is necessary (TB0<TS1), it is close to the upper limit temperature TS1 and that the battery temperature TB would therefore reach the upper limit temperature TS1 immediately, the process proceeds to step S112 in FIG. 3 where the control unit 70 starts driving the electrically operated cooling fan 40 immediately.

In the secondary battery cooling system 80 and the electric drive vehicle 100 on which the secondary battery cooling system 80 is mounted described above, if it is determined that, when the ignition switch 20 is turned off, the battery temperature TB would not reach the upper limit temperature TS1 immediately, start of driving the electrically operated cooling fan 40 is deferred from the time at which the ignition switch 20 is turned off by an amount corresponding to the first predetermined period, and the electrically operated cooling fan 40 is started when the battery temperature TB rises by a certain amount to increase the temperature difference from the cooled air. With this structure, it is possible to suppress a reduction in the cooling efficiency of the battery 10. Further, as efficient cooling of the battery 10 can lead to suppression of an energy loss caused by cooling the battery 10, it is possible to efficiently cool the battery 10 during suspension of charge and discharge. Also, because in the secondary battery cooling system 80 according to the present embodiment, when the ignition switch 20 is turned off, the heat value of the battery 10 is estimated to determine whether or not cooling of the battery 10 is necessary, and the battery 10 is cooled while the ignition switch 20 is off, and it is possible to start cooling the battery 10 from a desirable temperature even during a period in which determination of whether or not cooling is necessary cannot be made, such as after the ignition switch 20 is turned off, so that the battery 10 can be cooled efficiently during the ignition switch 20 is turned off.

Further, according to the above embodiment, as it is possible to prevent the battery temperature TB after the ignition switch 20 is turned off from exceeding the upper limit temperature TS1 without monitoring the temperature of the battery 10 after the ignition switch 20 is turned off, detection of the battery temperature TB by the temperature sensor 62 may be stopped when the ignition switch 20 is turned off. In this case, as a dark current for monitoring the battery temperature TB can be reduced, an increase in the electrical efficiency can be achieved with further efficiency.

Figure 7:
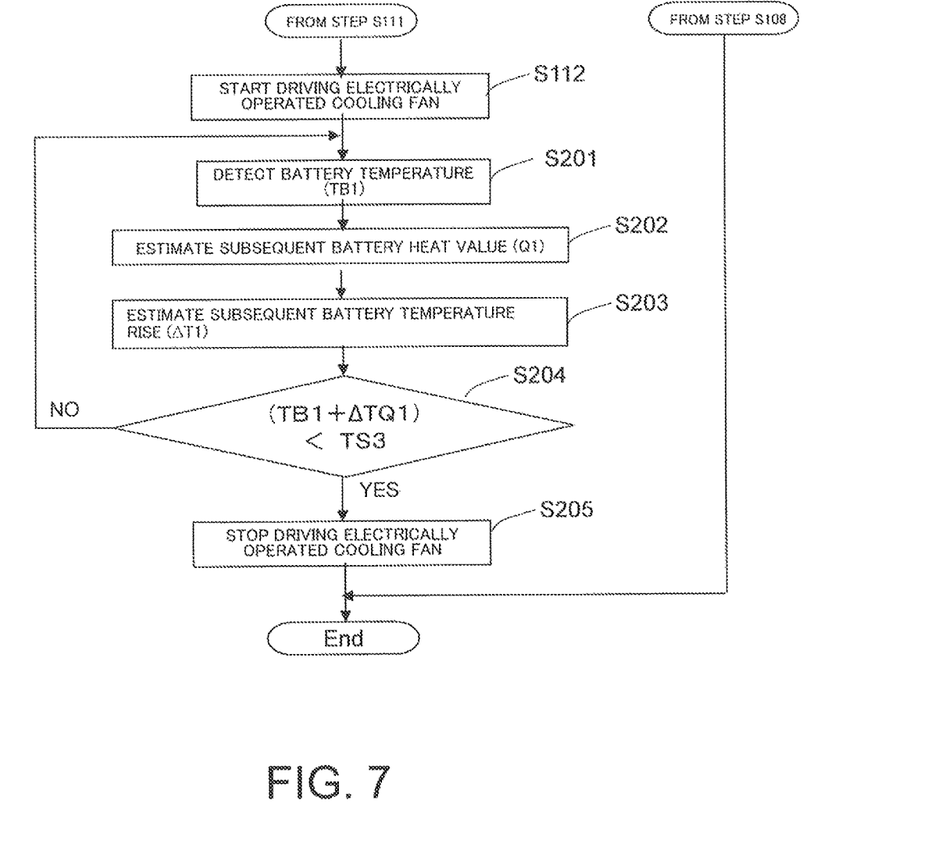
FIG. 7 is a flowchart illustrating another operation of the secondary battery cooling system according to an embodiment of the present invention.

In the secondary battery cooling system 80 and the electric drive vehicle 100 according to the above embodiment, the electrically operated cooling fan 40 is driven only during the second predetermined period after start of driving the electrically operated cooling fan 40. Alternatively, it is possible to detect the battery the temperature TB1 as shown in step S201 of FIG. 7 to estimate the subsequent heat value Q1 and the temperature rise ΔT1 of the battery 10 as shown in steps S202 and S203 in FIG. 7, calculate the sum of the battery temperature TB1 and the estimated subsequent temperature rise ΔT1 of the battery 10, that is, the maximum temperature TBH1 the battery 10 will reach subsequently, as shown in step S204 in FIG. 7, and, if the (TB1+ΔT1)=TBH1 is lower than a predetermined upper limit temperature TS3, based on the determination that further driving of the electrically operated cooling fan is necessary, stop the electrically operated cooling fan 40, as shown in step S205 in FIG. 7. The estimation of the heat value Q1 and the temperature rise ΔT1 is performed in a similar manner to that in steps S105 to S107 in FIG. 3.

As this operation can result in a shortened period of driving the electrically operated cooling fan 40 when compared to the operation in the example described above, the energy loss caused by cooling the battery 10 can be suppressed more efficiently.

While, in the embodiment described above, a nickel metal hydride battery has been described as an example of the battery 10 mounted on the electric drive vehicle 100, the secondary battery which is controlled by the secondary battery cooling system 80 according to the present embodiment is not limited to a nickel metal hydride battery, and may be, for example, a lithium ion battery which performs charge and discharge using a chemical reaction in which lithium ions move between the positive electrode and the negative electrode via an electrolyte, and the like.

While the preferred embodiments of the present invention have been described using specific terms, such description is for illustrative purposes only, and it is to be understood that changes and variations may be made without departing from the spirit or technical scope of the appended claims.

The invention claimed is:

1. A secondary battery cooling system, comprising:
a secondary battery mounted on a vehicle;
a temperature sensor configured to detect a temperature of the secondary battery mounted on a vehicle;
a cooling mechanism configured to cool the secondary battery; and
a control unit configured to stop driving of the cooling mechanism,
wherein the control unit performs,
in response to an ignition switch mounted on the vehicle being turned off, estimating a heat value of the secondary battery after the ignition switch is turned off,
calculating a temperature increase of the secondary battery after the ignition switch is turned off based on the estimated heat value of the secondary battery,
determining that cooling of the secondary battery is necessary after the ignition switch is turned off, under a condition where a temperature, which is obtained by adding the calculated temperature increase to a temperature of the secondary battery detected by the temperature sensor at a time that the ignition switch is turned off, exceeds an upper limit temperature which does not cause deterioration of the secondary battery, and
delaying from the time that the ignition switch is turned off, a start time of driving of the cooling mechanism to cool the secondary battery while the ignition switch of the vehicle is turned off in response to both of the following conditions (1)-(2): (1) the temperature of the secondary battery detected by the temperature sensor at the time that the ignition switch is turned off being lower than the upper limit temperature which does not cause deterioration of the secondary battery, and (2) the estimated heat value of the secondary battery that exceeds a predetermined value in the determination.

2. The secondary battery cooling system according to claim 1, wherein
the secondary battery is a nickel metal hydride battery, and
the heat value of the secondary battery is estimated based on an amount of oxygen absorbed in a negative electrode of the secondary battery.

3. The secondary battery cooling system according to claim 2, wherein
the amount of oxygen absorbed in the negative electrode is estimated based on a remaining capacity, temperature, and charging current of the secondary battery before the ignition switch is turned off.

4. The secondary battery cooling system according to claim 1, wherein
the control unit stops detection of the temperature of the secondary battery after the ignition switch is turned off.

* * * * *